United States Patent
Israelachvili

(10) Patent No.: US 6,194,813 B1
(45) Date of Patent: Feb. 27, 2001

(54) EXTENDED-RANGE XYZ LINEAR PIEZO-MECHANICAL SCANNER FOR SCANNING-PROBE AND SURFACE FORCE APPLICATIONS

(76) Inventor: Jacob Israelachvili, 2233 Foothill La., Santa Barbara, CA (US) 93105

( * ) Notice: Subject to any disclaimer, the term of this patent is extended or adjusted under 35 U.S.C. 154(b) by 0 days.

(21) Appl. No.: 09/408,461

(22) Filed: Sep. 29, 1999

(51) Int. Cl.⁷ .................................................. H01L 41/08
(52) U.S. Cl. ........................................ 310/328; 310/369
(58) Field of Search ...................................... 310/328, 369

(56) References Cited

U.S. PATENT DOCUMENTS

| | | | | |
|---|---|---|---|---|
| 4,523,120 | * | 6/1985 | Assard et al. ........................ | 310/323 |
| 5,173,605 | * | 12/1992 | Hayes et al. ........................ | 250/306 |
| 5,198,715 | * | 3/1993 | Elings et al. ........................ | 310/328 |
| 5,214,342 | * | 5/1993 | Yang ................................ | 310/328 |
| 5,323,082 | * | 6/1994 | Wright .............................. | 310/328 |
| 5,568,004 | * | 10/1996 | Kleindiek ........................... | 310/328 |

FOREIGN PATENT DOCUMENTS 0 413 397 * 2/1991 (EP) ...................................... 310/328

* cited by examiner

Primary Examiner—Thomas M. Dougherty
(74) Attorney, Agent, or Firm—The Kline Law Firm

(57) ABSTRACT

A piezo-mechanical scanner that provides independent and linear displacements in three orthogonal directions with high sensitivity in the normal z direction and high range in the lateral x and y directions. The independence of the directional displacements is ensured by physically dividing into four distinct sectors the piezoelectric tube chiefly responsible for the generation of the movements. Linearity of the movement is maintained by providing mechanical enhancement of the movements in the x-y plane.

7 Claims, 4 Drawing Sheets

US 6,194,813 B1

EXTENDED-RANGE XYZ LINEAR PIEZO-MECHANICAL SCANNER FOR SCANNING-PROBE AND SURFACE FORCE APPLICATIONS

FIELD OF THE INVENTION

The present invention relates generally to mechanisms to create precise scanning motions, and more particularly is a scanner that provides uncoupled motion in three orthogonal planes.

BACKGROUND OF THE INVENTION

Scanning Probe Microscope (SPM) instruments such as the Scanning Tunneling Microscope (STM), the Atomic Force Microscope (AFM), the Lateral Force Microscope (LFM) and the Friction Force Microscope (FFM), are research instruments that have been in use in universities and industrial R&D laboratories since the mid 1980's. These instruments allow for various imaging of surfaces as well as measurement of the intermolecular forces between two surfaces (or a small tip and a flat surface) in vapors or liquids. The distance resolution is typically on the order of 1 Å, which means that images can be obtained and forces measured at the atomic level. Over the years, SPM techniques have been improved and their scope extended so that it is now possible to image different types of surfaces and measure different surface properties and phenomena than historically possible.

SPM's operate by first bringing (positioning) the tip or 'sensor' surface near the "sample" surface, and then moving the tip vertically (normal mode) or laterally (scanning mode) to obtain a mechanical or topographical "image" of the sample surface or to measure some other property, such as the deflection force, that is sensed by the tip or sensor surface. The generation of an image or the measurement of a force is accomplished by monitoring the deflection of a cantilever spring supporting the tip as it scans the surface.

To obtain reliable images or property measurements, it is essential that the user be able to move the tip precisely in the z direction (up and down) as well as in the x and y directions (across the surface). Ideally, any induced motion in the, for example, x-direction does not produce unwanted motions in the y or z directions. In addition, given that relatively large areas usually need to be scanned, it is imperative that these motions be linear, e.g., precisely proportional to the applied voltage across the piezo element. Moreover, displacements in the normal "sensing" direction are typically in the angstrom range while those in the lateral 'scanning' directions are typically in the tens of microns range.

In most SPM and SFA applications the displacements of the 'tip', 'sensor surface' or 'sample surface' have different requirements in the lateral (x, y) and vertical (z) directions. Lateral motion is required for 'scanning', usually over large areas extending tens or hundreds of microns. In contrast, normal motion is generally required for topographical imaging or sensing some surface physical or chemical heterogeneity over distances in the nanometer range. These very different length scale requirements make it imperative to have a displacement transducer that separately optimizes and decouples the normal and lateral displacements.

However, the scanners used in existing SPM devices utilize a single piezoelectric tube to generate all of the available displacements, or they use multiple displacement generation elements that work against each other. Therefore, the normal and lateral motions generated are intimately coupled to each other in a way that makes it difficult to generate large lateral displacements and small normal displacements at the same time, while still maintaining the independence and linearity of the displacements.

The most common type of piezo element currently in use is the "sectored" piezo-electric tube in the style shown in FIGS. 1A–C (top and side views). The piezoelectric tube is sectored into four quadrants, labelled 1–4. The 'sectoring' is achieved by removing the conducting metallic coatings from the outer and inner walls along the four strips 1–4, as shown. This process results in four electrically (but not mechanically) separate sections of the original tube.

Normal motion in the z-direction is produced by applying the same voltage differential, $\Delta V_1 = \Delta V_2 = \Delta V_3 = \Delta V_4$, across the inner and outer conducting walls of the four sectored quadrants of the piezoelectric tube. A positive voltage differential ($\Delta V>0$) produces expansion ($\Delta z>0$) and a negative voltage differential ($\Delta V<0$) produces contraction ($\Delta z<0$) of the tube.

Lateral motions in the x and y directions are produced by applying different voltages across the four sectors of the tube. For example, if $\Delta V_1 = -\Delta V_3$ and $\Delta V_2 = \Delta V_4 = 0$, sector 1 will expand and sector 2 will contract. The net effect will be a bending of the end of the tube (which supports the tip) in the +x direction, as shown in FIG. 1C. At the same time, one may apply additional voltages across the other sectors so as to produce simultaneous motions along different directions, for example, in the y or z direction. In this way, any desired motion along any desired direction in space can, in principle, be induced by applying suitable voltage differences across the four sectors of the scanner piezoelectric tube.

However, the simultaneous requirements of high sensitivity in the z direction and high range in x and y directions are not attainable with current art designs. There are two reasons for this: first, the motions are not perfectly independent but coupled. Thus, when motion is generated in the x direction, the movement of the tip more closely approximates an arc of a circle as opposed to a straight line. This effect is illustrated in FIG. 1C. The resulting displacement in the x direction is therefore accompanied by a slight lifting of the tip in the z direction, as well as a slight rotation of the tip. These effects are negligible for small deflections, but become non-negligible when scanning over large lateral distances, which is often required.

Second, piezoelectric transducers become non-linear when high voltages are applied across them, i.e., the displacement is no longer proportional to the voltages applied across the different sectors. In addition, when operated in the non-linear region they tend to drift over time, i.e., their length changes with time because they are strained beyond their elastic limit. In most SPM applications, the piezo elements are subjected to voltages well above their linear range because of the need to have large scanning distances (typically>5 $\mu$m) which is often well above the linear region.

These two problems make it difficult to unambiguously interpret many images and other types of surface measurements quantitatively and sometimes even qualitatively. To alleviate these problems, which are related (large non-linear displacements also produce larger coupling between motions in the x, y and z directions), software packages are now available that can "correct" these defects. See e.g. U.S. Pat. No. 5,081,390, issued Jan. 14, 1992, to Ellings. The corrections are typically achieved by employing feedback sensors from the four sectors that allow the software to coordinate the voltages across them. Such software packages have limited success because piezoelectric elements are mechanically very complex. Their dimensions depend not only on the voltage across them but also on the load (force), the temperature, the time elapsed since the voltage has been applied, and the previous history. In addition, remedies that are based purely on a software program cannot overcome the inherent deficiencies in the basic mechanical design of the sectored piezoelectric tube illustrated in FIGS. 1A–C. For example, no amount of feedback can avoid the bending of the tube (and hence rotation of the tip) when producing motion in the x and y directions. Finally, the additional space and cost associated with the need to introduce feedback sensors, whether capacitance or light based, have made SPM scanners much more bulky, software intensive, and costly than is necessary for this essentially simple micro-mechanical device.

The above described deficiencies are becoming ever more serious because of the increasing demand for scanners that have a large lateral range of travel. It is not clear how or if software packages can solve the basic deficiencies inherent in conventional scanners.

Accordingly, it is an objective of the present invention to provide a new design capable of producing inherently linear and uncoupled (i.e., independent) motions in three orthogonal directions in space, without requiring any feedback mechanisms.

It is another objective of the present invention to provide a piezoelectric tube that includes four mechanically and electrically isolated sectors.

SUMMARY OF THE INVENTION

The present invention is a piezo-mechanical scanner that provides independent and linear displacements in three orthogonal directions with high sensitivity in the normal z direction and high range in the lateral x and y directions. The independence of the directional displacements is ensured by physically dividing into four distinct sectors the piezoelectric tube chiefly responsible for the generation of the movements. Linearity of the movement is maintained by providing mechanical enhancement of the movements in the x-y plane.

An advantage of the present invention is that the movements of the scanner are all within the linear operating range.

Another advantage of the present invention is that movement in any given direction is completely uncoupled from movement in another direction.

Still another advantage of the present invention is that it can be contained completely within a housing, thereby reducing the possibility of any external influences on the scanner, and increasing the stability of the sensing tip.

A still further advantage of the present invention is that it allows for practical utilization of an optical microscope for direct observation of the subject surfaces.

DETAILED DESCRIPTION OF THE INVENTION

Figure 2:
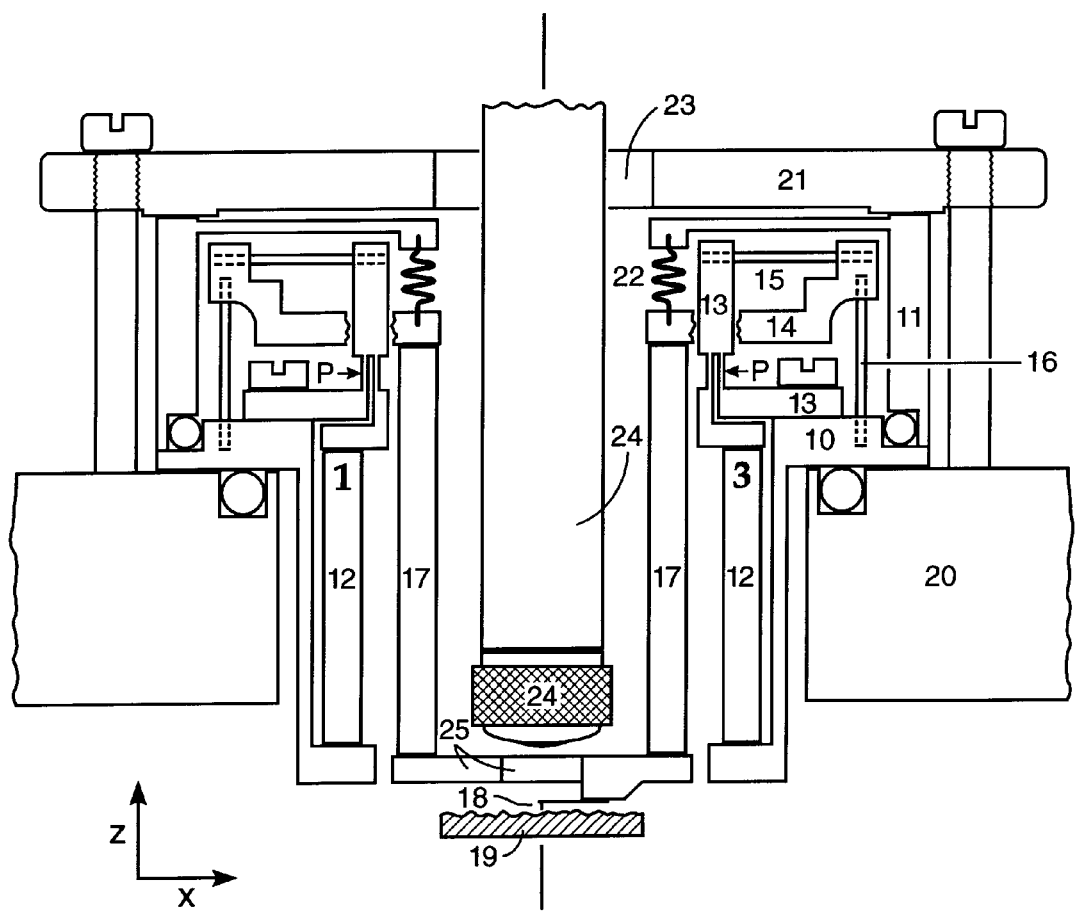
FIG. 2 is a front side, sectional view of the piezo-mechanical scanner of the present invention.
Figure 3:
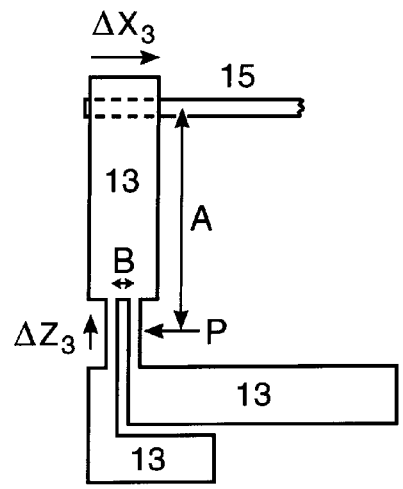
FIG. 3 is a detail view of the lever stage of the piezo-mechanical scanner of the present invention.
Figure 4:
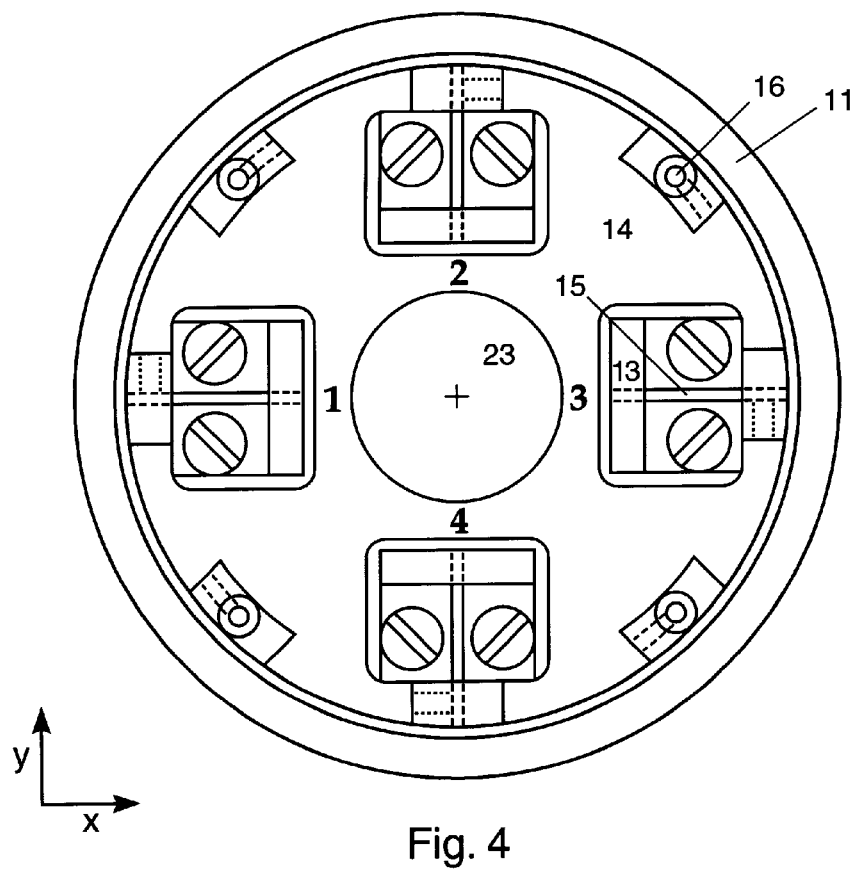
FIG. 4 is a top view of the piezo-mechanical scanner of the present invention.
Figure 5:
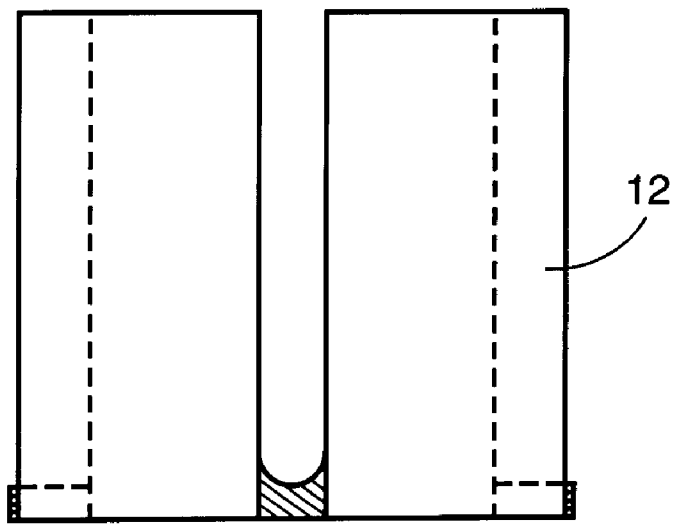
FIG. 5 is a side view of the physically sectored piezoelectric tube utilized in the present invention.
Figure 6:
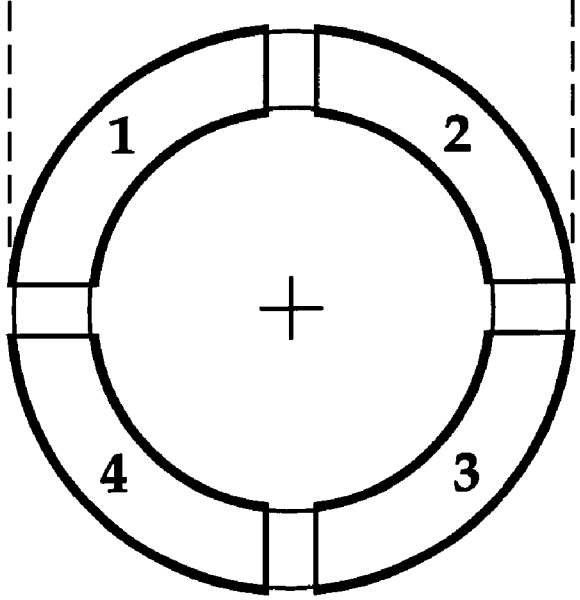
FIG. 6 is a top view of the physically sectored piezoelectric tube utilized in the present invention.

The present invention is a piezo-mechanical scanner, as illustrated in FIGS. 2–6. FIGS. 2–4 show the basic mechanical design features of the preferred embodiment of the piezo-mechanical scanner, and FIGS. 5 and 6 show the main (outer) piezo tube 12.

The scanner is enclosed in a metal casing or housing comprising a lower portion 10 and an upper portion 11. A main piezoelectric tube 12 is attached to the housing. The main piezoelectric tube 12 is a physically and electrically sectored piezo tube, and the structure of the tube will be discussed in greater detail below. A first end of the main piezoelectric tube 12 is attached (generally by adhesive) via insulating gaskets to housing base 10, and a second end of the main piezoelectric tube 12 is attached to a lever stage 13. Lever stage 13 is connected to a stage 14 by four horizontal rod or wire springs 15.

One end of stage 14 is connected to housing 10 by four vertical wire springs 16. A second end of stage 14 is connected to an inner piezoelectric tube 17 via insulating gaskets. As with the main piezoelectric tube 12, the method of securing the stage 14 to the piezo tube 17 is usually via an adhesive. The lower end of the inner piezoelectric tube 17 is glued to a lower stage 25. The lower stage 25 supports the tip or sensor surface 18 which is scanned across the sample surface 19.

The entire scanner unit is clamped onto the top of an instrument chamber 20 (which could be an SPM or SFA) via cover clamp 21. The scanner is sealed from the outside atmosphere by the housing 10, 11 a stainless steel bellows 22, the piezo tube 17, and the lower stage 25. A hole 23 through the center of the cover clamp 21 allows the user to insert an ordinary optical microscope tube 24 if desired. The optical microscope 24 allows the user to directly view the tip 18 and sample surfaces 19. A silica glass window 25 allows light to pass through the apparatus wall into the microscope objective lens.

Movement of the scanner probe tip 18 is controlled chiefly by the main piezoelectric tube 12. By applying known voltages across the four sectors of the main piezo tube 12, the four sectors of piezo tube 12 can be made to expand or contract linearly along their lengths in the ±z direction. The expansion and contraction of each sector is independent of any expansion or contraction in another sector. This decoupling is possible because vertical slots have been formed between the sectors of the main piezoelectric tube 12 by removing the tube material from between each sector. A small connecting section at the base of each vertical slot is left intact so that the tube maintains rigidity during assembly. The connecting sections have all the conducting material removed from both their outer and inner conducting surfaces.

When a voltage $\Delta V_1 = -\Delta V_3$ is applied across opposing sectors, one sector expands and the other contracts by the same amount, $\pm \Delta Z$. These vertical motions are in turn translated into lateral motions $\pm \Delta X$ in the x-direction because the rectangular arm, the upper part of stage lever 13, (see FIG. 3), rotates about the pivot point P (for each sector) centered between the two thin vertically parallel cantilever strips of stage lever 13. The lateral distance moved in the ±x direction, $\Delta X$, is proportional to the vertical displacement of the piezo sectors, $\Delta Z$, and is given by $\Delta X = (A/B) \Delta Z$, where A/B is the 'mechanical magnification factor' which is determined by the geometry of stage lever 13, and will be typically of order 10.

In the example for the sector shown in FIG. 3, the piezo sector expansion, $\Delta Z_3$ is positive (upwards), so that the rectangular arm of stage lever 13 rotates in the clockwise direction, and $\Delta X_3$ is positive (to the right). Simultaneously, the corresponding piezo of sector 1 contracts, $\Delta Z_1$ is negative (downwards), but the arm still rotates in the clockwise direction, and $\Delta X_1$ is again positive (to the right), which reinforces the displacement of sector 3 to which sector 1 is coupled.

In this way, linear motion in the z-direction is translated to magnified linear motion in the x-direction. Likewise, coupled voltages applied across sectors 2 and 4 generate displacements in the ±y direction independently of the displacement in the x-direction.

The four horizontal wire springs 15 on the stage levers 13 couple the motions in the ±x and ±y directions to stage 14 (see FIG. 4). The stage 14 is connected via four vertical wire springs 16 to the rigid housing base 10. The four vertical springs 16 act like the legs of a table and allow for linear motion in the horizontal plane of stage 14, which is itself connected to the tip or sensor surface 18 via inner piezo tube 17.

Inner piezoelectric tube 17, which is not required to be physically sectored but which may be if desired, allows for fine control of tip displacements in the ±z direction independently of the x and y displacements (which are controlled by the main piezo 12). These normal displacements will in general be small—much smaller than the lateral displacements, so that the inner piezo tube is always operated within its linear region.

The advantages of the structure and operation of the present invention are as follows:

(1) LINEARITY. The present invention allows for generating linear motion along three orthogonal directions (x, y and z) completely independently of each other, but with motion in all three directions available at the same time. Linearity is achieved by (i) decoupling the piezo elements that give rise to each displacement, and (ii) mechanically amplifying the movement in the x and y directions. By magnifying the linear motion of piezo elements mechanically, via stage lever 13, rather than increasing the voltage beyond the non-linear range, a much higher displacement is achieved while still remaining in the linear region. The 'mechanical magnification factor' A/B can be chosen to be 10 or more by a suitable choice of dimensions for stage lever 13.

Figure 1A:
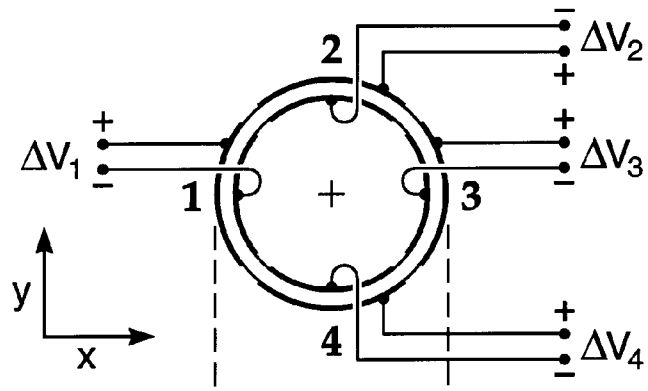
FIGS. 1A–C illustrate a conventional "sectored" piezoelectric scanner currently used in most SPM devices.
Figure 1B:
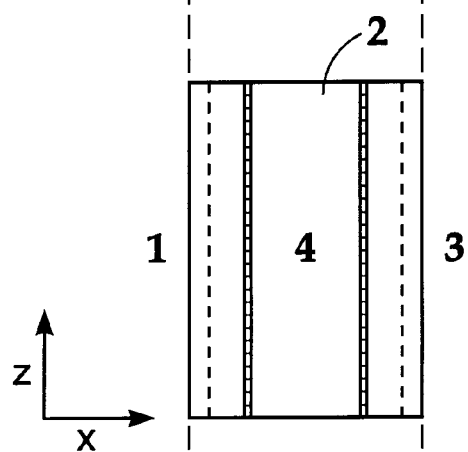
Figure 1C:
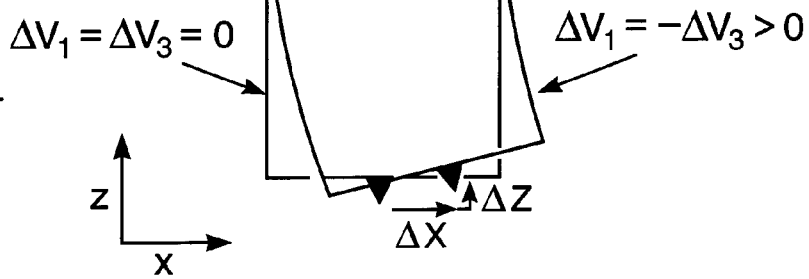

(2) DECOUPLED DISPLACEMENTS IN X, Y, AND Z DIRECTIONS. The independence of the three motions from each other means that more reliable and stable displacements can be applied than is currently possible with existing piezoelectric tubes (cf. FIG. 1). It also means that fine movements can be generated by applying relatively low voltages to the inner piezo tube 17. This reduces the problems of drift and creep which arise when piezos are strained beyond their linear region or when elements are mechanically coupled to each other. The separate fine control in the normal, z-direction is particularly useful in many SPM and related devices where one generally needs to independently fine adjust the normal displacement by angstroms without interfering with the 'coarse' lateral displacement in any way, and vice versa.

(3) ISOLATION AND STABILITY. The piezo-mechanical scanner is completely sealed in its housing, thereby allowing for its installation into almost any SPM, SFA or other positioning chamber whose atmosphere (relative humidity, organic vapor contamination) can be kept clean or fully controlled. Since normal displacements are controlled mainly mechanically (the inner piezo tube 17 for fine distance control having relatively thick, robust walls) the new device will have much less hysteresis and drift than scanner heads employing conventional piezo tubes. In addition, the physically sectored main piezo tube 12 (which will be more sensitive to thermal drifts and creep) is isolated from both walls of the scanner, making it particularly well-shielded from extraneous temperature drift, thereby adding to the stability of the tip position.

(4) SIMULTANEOUS OPTICAL IMAGING. The new scanner may be used with an optical microscope for directly visualizing the surfaces during scanning. In addition, with the proposed design, the microscope objective 24 can be placed very close to the surfaces on either the 'tip' or 'sample' sides.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A piezo-mechanical scanner comprising:

a main piezoelectric tube to generate motion of a probe tip of said scanner along a first axis and a second axis in a first plane, motion along said first axis being independent from motion along said second axis, a mechanical advantage means that is not part of said main piezoelectric tube, said mechanical advantage means translates vertical expansion and contraction of said main piezoelectric tube generated by voltage differentials within a linear operating range of said main piezoelectric tube into resultant motion of said probe tip; wherein said resultant motion of said probe tip is also linear, and is non-hysteretic and creep-free.

2. The piezo-mechanical scanner of claim 1 wherein:

said main piezoelectric tube comprises a plurality of sectors, each one of said sectors being physically separated from each of the other sectors so that motion generated by a first pair of opposing sectors along said first axis is not affected by motion simultaneously generated by a second pair of opposing sectors along a second axis.

3. The piezo-mechanical scanner of claim 2 wherein:

said main piezoelectric tube is substantially cylindrical in shape, and said sectors are created by longitudinal slots in walls of said main piezoelectric tube, a lower connecting portion of said walls having conducting material removed in a region corresponding to said longitudinal slots to ensure electrical isolation of said sectors.

4. The piezo-mechanical scanner of claim 1 wherein:

said scanner comprises a second piezoelectric tube that generates motion in a second plane orthogonal to said first plane.

5. A piezo-mechanical scanner comprising:

a main piezoelectric tube to generate motion of a probe tip of said scanner along a first axis and a second axis in a first plane, motion along said first axis being independent from motion along said second axis, a mechanical advantage means that is not part of said main piezoelectric tube, said mechanical advantage means translates a vertical expansion and contraction of said main piezoelectric tube generated by voltage differentials within a linear operating range of said main piezoelectric tube into a resultant motion of said probe tip, and a second piezoelectric tube that generates motion in a second plane orthogonal to said first plane; wherein said resultant motion of said probe tip is also linear, and is non-hysteretic and creep-free.

6. The piezo-mechanical scanner of claim 5 wherein:

said main piezoelectric tube comprises a plurality of sectors, each one of said sectors being physically separated from each of the other sectors so that motion generated by a first pair of opposing sectors along said first axis is not affected by motion simultaneously generated by a second pair of opposing sectors along a second axis.

7. The piezo-mechanical scanner of claim 6 wherein:

said main piezoelectric tube is substantially cylindrical in shape, and said sectors are created by longitudinal slots in walls of said main piezoelectric tube, a lower connecting portion of said walls having conducting material removed in a region corresponding to said longitudinal slots to ensure electrical isolation of said sectors.

* * * * *